United States Patent Office 3,153,586
Patented Oct. 20, 1964

3,153,586
SLAG COATED ORE COMPACTS AND PROCESS
FOR MAKING THE SAME
Fritz O. Wienert and Anthony F. Nasiadka, Niagara
Falls, N.Y., assignors to Union Carbide Corporation,
a corporation of New York
No Drawing. Filed May 6, 1960, Ser. No. 27,273
14 Claims. (Cl. 75—3)

This invention relates to novel compacts, an improved method of producing compacts and a method of heat treating the compacts.

Most of the present-day commercial metallurgical processes for oxidizing or reducing industrial ores are carried out in massive expensive furnaces such as the classical blast furnace and numerous other liquid state furnaces. Owing to the expenses involved and for other reasons, these furnaces must operate continuously at or near rated capacity. Should the production schedule be reduced or interrupted, these furnaces would have to be either operated at a loss or shut down.

U.S. Patent 2,869,850 by Wienert discloses a means of obviating this condition. The patent provides a method for preparing and heat treating reactant materials in a kiln comprising forming the reactants into agglomerated bodies, providing coatings on the outer surfaces of such formed bodies, and heating the coated bodies in a combustion atmosphere whereby either oxidation or reduction can be effected within the coated bodies during the heating thereof. The oxidation or reduction can be effected independently of the character of the surrounding combustion atmosphere. A coating method is disclosed therein which comprises moistening the agglomerated bodies with water or some other suitable wetting agent and rolling the moistened bodies in a coating powder. Examples of satisfactory coating powders included glue, starch, water-glass, and pitch. An alternate coating procedure taught in the Wienert patent involved moistening the pellets as previously described, but to a lesser degree and then treating them with a suspension, solution or emulsion containing a binder such as water-glass, molasses, glucose, or warm tar.

These methods, which have actually been proven acceptable in so-called low temperature commercial operations, do not, however, offer maximum protection from oxidation during high temperature reductions in a rotary kiln and consequently a portion of the ores in the agglomerated bodies may remain only partially reduced.

It is an object of the present invention to provide a method of improving the degree of reduction in compacts or ore and carbonaceous matter in a combustion-fired, high temperature furnace operation.

Another object of the present invention is to provide an improved degree of reduction at a high kiln capacity in a high-temperature rotary kiln operation.

Still another object is to provide a method of producing compacts containing an improved outer coating.

It is a further object to provide compacts with improved outer protective coatings.

Additional objects together with the attendant advantages will appear evident from the examples, subsequent disclosure and appended claims.

The process which accomplishes the above-mentioned objects comprises admixing finely-divided oxidic ore with a stoichiometric excess of carbonaceous reducing agent sufficient to convert all of the oxygen of the metal-value components of the oxidic ore to carbon monoxide and to form at least a substantial amount of carbides of the metal values; compacting the mixture to produce a core; providing the core with a coating of at least one acid slag forming constituent and at least one basic slag forming constituent; exposing the compacts to a heating source to cause reduction of the ore; and removing the compacts from the heating source under non-oxidizing conditions.

The compact before exposure to the heating atmosphere consists of an inner core of nodule of oxidic ore in admixture with at least a sufficient amount of carbonaceous reducing material to cause reaction between the carbon component of the reducing agent and the oxygen component of the metal values of the ore to form carbon monoxide and to form at least a substantial amount of carbides of the metal values; and outer protective slag forming coating consisting of at least one acid slag-forming constituent and at least one basic slag forming constituent.

The function of the protective slag coating is to allow the reducing reaction between the metallic oxides and the carbonaceous reducing agent in the core to proceed irrespective of, and uninfluenced by, the chemical nature of the surrounding atmosphere. With the use of the slag coating, the heat source in the reaction furnace can be a reducing, neutral or oxidizing atmosphere.

It is also within the scope of the present invention to provide the slag-forming coating for the inner core or nodule of the compacts by charging the unreacted nodules into a rotary kiln containing carbonaceous material having a high ash content and/or fine slag-forming components such as fly ash and silica. During firing, the fly ash and silica will coat the nodule with a slag coating as evidenced in the following examples.

To accomplish its function, the protective slag coating must have a ratio of acidic to basic slag-forming constituents at the slag-forming temperature which results in the lowest possible fusion point, yet maintains a slag of high enough viscosity to preclude slag penetration of the core to any substantial extent and will allow carbon monoxide, which is evolved in the reduction reaction to escape.

As a general rule, an increase in acidity of the slag (e.g. an increase in the ratio of silica to the basic constituent) will result in a slag of higher viscosity and simultaneously increases the fusion point of the slag. Iron oxide is especially amenable as a basic constituent. Its combination with silica will aid in lowering the fusion point of the slag, yet it also aids in maintaining a high viscosity because the iron oxide component of the slag is reduced by carbon monoxide being evolved from the core to form metallic iron. The metallic iron is in a semi-fused or softened condition and aids in increasing the slag viscosity while also providing a highly reducing slag.

It is often desirable to incorporate a small amount of carbon in the slag forming coat when FeO is used as the basic constituent to aid in partial reduction of the FeO. The use of FeO also leads to a slag which increases in viscosity with temperature. The reduction of FeO by carbon and carbon monoxide offsets the ratio of acid to base resulting in an increased viscosity due to an increase in acidity.

The slag-forming operation proceeds at elevated temperatures; therefore, the use of metallic materials which will oxidize to a basic slag form before the temperature of slag formation is reached are also commensurate with the teachings of the present process. Metallic iron is especially useful as a metallic constituent from the economical as well as chemical aspect.

When using metallic iron as the basic slag-forming constituent in the slag coating, the heating atmosphere must be oxidizing in nature. The metallic iron rapidly oxidizes to act as a basic slag forming constituent and combines with an acid constituent such as silica. Pre-formed ferrosilicate is an example of a slag forming constituent which contains both the acid and basic components. Fly ash, soda ash, coke ash, slag waste, ore gangue tailings and sodium silicate are other examples of slag-forming constituents. Water glass may be used only as minor constituent because it is very fluid at higher temperatures. In some cases the slag-forming constituent may be partially provided by materials present on the perimeter of the core itself such as the ash resulting from the combustion of carbonaceous reducing agents like coal or coke which contains calcium and magnesium oxide, silica and alumina in addition to small amounts of iron.

The particle size of the slag-forming constituents is not critical although the preferred range is about 200 Standard Tyler mesh.

The slag formation may be caused by either complete fusion or partial fusion. The only criterion, as herein above mentioned, is that the protective slag coating substantially seal the compact from the surrounding heat source or atmosphere yet be of sufficient viscosity to allow carbon oxide evolved in the core reaction to escape. A small amount of carbon may be added to the most slag-forming coatings to aid in fusion by combustion of the carbon during the firing operation.

Another method of applying the slag-forming, protective layer, which is especially applicable to pressure compacts having edges and corners, comprises dipping the compacts in a slurry prepared from the slag forming components and binders.

Any oxidic are capable of being reduced with a carbonaceous reducing material may be used in the core or nodule of the compact of the present process. Oxides of iron, titanium and chromium are especially amenable. Examples of oxidic ores of such materials would be chromite, hematite, taconite, magnetite, ilmenite, etc. The carbonaceous reducing agent may consist of coke and coal of various types. The particle size of the constituents of the inner core or nodule is not critical. In the preferred embodiment, they are less than 200 Standard Tyler mesh. A smaller size will aid in the bonding of the core and will cause an increase in the rate of reduction of the ore within the core.

Due to the fact that ore compacts made with carbon low in volatile matter are harder and remain harder during heat treatment in comparison with a carbon source high in volatile matter such as bituminous coal, coke is generally preferred as a reductant.

It is preferable to introduce a slight amount of flux such as fluorspar in the core mixture to increase the rate of reaction between the ore and the reducing agent. Also, limestone or burned lime is preferably added to aid in the removal of sulfur from the ore and carbonaceous reducing agent to reduce its detrimental effect on the final reduced metal. Burned lime cannot be used when aqueous binders are present because the lime will slake to some extent.

Suitable binders include sodium silicate, diluted molasses and bentonite suspensions. Sodium silicate is preferred since it has bonding properties over the whole temperature range from the drying step up to and including the fritting and fusion step.

After the coating of the slag-forming constituents has been applied, the compacts may be studded with a superficial layer of carbonaceous particles of carbon, fly ash, char, anthracite, bituminous and/or lignite. This superficial coating of carbonaceous bits is added simply to prevent adherence between the compacts themselves or the compacts and the furnace lining during the firing operation in a rotary kiln. The ash resulting from combustion of this studded coating also aids in the formation of the slag coating. The agglomerations may be partially or substantially dried before application of the superficial carbonaceous coating. In addition, the superficial studding may be done after or during the application of the slag forming coating.

Many compacting methods, well known in the art such as cold pressing, rolling, hot pressing, etc. may be employed in the present process. The preferred method of forming compacts is agglomeration by rolling. This method allows the efficient preparation of compacts having non-homogeneous cores wherein the outer portion differs from the inner portion by an increase in the carbon to ore ratio. The outer portion always contains an excess of carbon over the inner portion and also a stoichiometric excess of carbon over that required to produce carbon monoxide in the outer portion. An increase of reducing carbon towards the surface of the compacts may be effected by building up a carbon-enriched outer portion on the inner core when it has reached the desired size, while the binder solution is continually applied to the growing nodule. An advantage of having the carbon enriched in the outer zone only is that only a small amount of free carbon, if any, remains in the central part after the reduction reaction. This is desirable because a lower free carbon content facilitates the subsequent treatment of reduced pellets in melting or physical beneficiation. The non-homogeneous-core-compacts may contain two distinct zones with an abrupt variance of the carbon to ore ratio. These cores are termed herein duplex-cored compacts. They could be considered to consist of an inner nodule and an outer envelope.

The size of the nodule composed of ore and reductant can vary generally from 0.25 to 1.0 inch in diameter without detrimentally affecting the extent of reduction of the ore during firing. The preferred nodule size is 0.5 to 0.75 inch in diameter.

The mixture of coated compacts and finer sized embedding carbon is charged into a rotary kiln or other suitable furnace such as a low shaft furnace, where it is heated by fuel combustion. The time of heat treatment (passage time) the heat released by the flame, and the highest bed temperatures are adjusted in such a way that the desired reduction of the metal values in the compact is obtained. In order to achieve full utilization of the combustion heat of the fuel, the flame atmosphere commonly contains a slight excess of free oxygen. The term atmosphere will be defined to include not only atmospheres created by combustion but rather any atmosphere present during heating.

When the desired reduction temperature is reached in the furnace, the bed is discharged. In some instances it may be desirable to maintain the reduction temperature for a period of time. It will be understood that the hot separation of the reacted charge from the heat source must be carried out under non-oxidizing conditions to prevent reversion of the reduced metals to their oxides at the elevated temperature of discharge.

The discharge of product may be cooled first in a non-oxidizing atmosphere until the temperature reaches a level at which the reduced compacts and the remaining embedding carbon are no longer susceptible to further oxidation. At this point the separation of reduced metals may take place in an atmosphere such as air. Also the discharge from the rotary kiln may be cooled quickly by a quenching operation without special regard to the character of the atmosphere above the quenching pit.

The following examples, which illustrate the practice of the subject invention, relate to the reduction of chromite ores. However, it will be understood that other ores which are carbon reducible at the temperatures encountered may be treated in such reactors as the rotary kiln and other reactors.

In the following examples, the mesh specification system is the Standard Tyler System and all reference to "parts" is meant to connote parts by weight.

The following examples are introduced to illustrate specific embodiments of the present process.

Example I readily shows the influence of the protective slag coating by comparing agglomerates fired with and without the coating.

Example II shows the fabrication and treatment of agglomerates under an oxidizing atmosphere.

Examples III and IV show the fabrication and treatment of duplex-core compacts containing the carbonaceous reducing material in a non-uniform distribution within each compact and the addition of fluxing agents to the core with various slag forming constituents in the protective coating.

Example V shows the formation of the slag-coating during kiln-firing.

*Example I*

One hundred parts of ore were sized so that 98 weight percent passed through a 325 mesh screen. The ore had approximately the following composition:

| | Weight percent |
|---|---|
| Total Cr (as oxide) | 30.68 |
| Total Fe (as oxides) | 19.77 |
| $SiO_2$ | 2.10 |
| MgO | 11.28 |
| CaO | 0.11 |
| $Al_2O_3$ | 15.16 |

Thirty parts of reducing coke were sized so that 95 weight percent passed a 325 mesh screen. The coke had approximately the following composition:

| | Weight percent |
|---|---|
| Fixed carbon | 79.45 |
| Volatiles | 6.87 |
| Ash | 13.68 |
| Moisture | 0.70 |
| Sulfur | 0.81 |
| Iron | 1.24 |

The above ore and coke were thoroughly mixed with 2 parts of commercial fluorspar sized 200 mesh by down and agglomerated on an inclined rotating disc with a 5 weight percent sodium silicate solution to form ball-shaped compacts approximately 0.5 to 0.75 inch in diameter.

Half of the compacts were dried and weighed in preparation for kiln usage as uncoated compacts. The other half of the compacts, still in a damp condition, were returned to the inclined rotating disc and provided with a slag-forming coating of a mixture of 40 parts hematite ore, 10 parts coke, 30 parts silica, 10 parts calcium carbonate, and 6 parts sodium carbonate as slag forming constituents to form coated compacts. The coating mixture was sized 200 mesh by down and was applied with the aid of 20 weight percent sodium silicate solution in which 2 weight percent bentonite was suspended.

In two identical heats both the coated and uncoated compacts in amounts of 2500 grams each were fed separately to a rotary furnace containing 3750 grams of embedding coal sized 0.25 inch by 14 mesh. The charge in the rotary furnace was heated with a neutral flame from approximately 25 to 900° C. in a time interval of 45 minutes and the temperature was increased from 900 to 1400° C. in an additional interval of 35 minutes. The charge was not held at the maximum temperature but immediately on reaching the end temperature the flame was reduced and 2000 grams of embedding coal were added to cool the charge. The reacted compacts were then discharged in solid $CO_2$ and separated from the embedding material.

The following analytical results were obtained on the products from the above comparative test.

| | Coated Pellets | Uncoated Pellets |
|---|---|---|
| Total Cr percent | 28.77 | 30.22 |
| Reduced Cr do | 25.44 | 8.60 |
| Percent Cr Reduced | 88.7 | 28.4 |
| Total Fe percent | 25.53 | 20.29 |
| Reduced Fe do | 24.71 | 13.11 |
| Percent Fe Reduced | 96.9 | 64.6 |
| Total C percent | 5.48 | 2.14 |

*Example II*

Chromite ore containing 30 weight percent chromium, 15 weight percent iron as oxides and about 15 weight percent $Al_2O_3$, 10 weight percent MgO, and 3 weight percent $SiO_2$ as gangue constituents, was ground until 96 weight percent passed a standard 325 mesh screen. One hundred parts of this ground ore were mixed with 30 parts of coal char of similar particle size and four parts of limestone ground to pass a standard 200 mesh screen. The mixed powder was agglomerated on an inclined, rotary-pan-pelletizer utilizing an aqueous solution containing 8 percent sodium silicate. When the compacted agglomerate reached the diameter of approximately 0.25 inch, agglomeration was continued with a mixture consisting of 80 parts fine char, 20 parts of ground silica and 4 parts of ground limestone as a slag-forming coat. This mixture was charged to the pelletizer until the coating layer of slag-forming constituents reached approximately 20 percent of the weight of the original ore pellet. The coated compacts were dried and 4100 parts of these dried pellets were heated together with 3940 parts of charred bituminous coal sized to pass an 8 mesh screen and remain on a 35 mesh screen in a rotary kiln fired by a flame containing a slight excess of oxygen. The heating rate was such that the charge remained for 34 minutes in a temperature range of from 1050 to 1400° C. The bed was then discharged into water and separated by screening into reduced pellets and residual char. After drying, the pellets were analyzed and showed to contain 27.8 weight percent total chromium, 23.33 weight percent reduced chromium, 21.22 weight percent total iron, 21.10 weight percent reduced iron, and 4.06 weight percent carbon. It may, therefore, be seen that approximately 84 percent of the chromium and 99.5 percent of the iron were reduced.

*Example III*

The same ore with the same particle size as in Example II was mixed in the ratio of 100 parts of ore, 30 parts of fine metallurgical coke sized to pass a 200 mesh screen, and 2 parts of fluorspar also sized to pass a 200 mesh screen. The mixture was pelletized as before, except that the aqueous solution contained, in this case, 5 percent sodium silicate. When the pellets reached diameters between 0.5 and 0.75 inch, a mixture of 68 parts of fine metallurgical coke sized to pass a 200 mesh screen and 30 parts of ferrous chromite containing $Al_2O_3$, MgO and $SiO_2$ as gangue constituents similar to the ore in the main body of the pellet, and 2 parts of fluorspar was rolled over the pellets as a coating with a 15 percent sodium silicate binder until the coating reached approximately 20 percent of the weight of the core pellet.

The coated pellets were dried and 8000 parts of the dried pellets were heated together with 3900 parts metallurgical coke sized to pass a 14 mesh screen and remain on a 25 mesh screen in a rotary kiln fired by a gas-oxygen flame containing a slight excess of oxygen. The heating rate was such that the charge remained for 95 minutes in the temperature range of from 1050 to 1350° C. The bed was discharged into solid carbon dioxide. The interior of the pellets was composed as follows: 29.69 weight percent total chromium, 23.93 weight percent reduced chromium, 19.38 weight percent total iron, 17.91 weight percent reduced iron and 9.36 weight percent carbon. It may, therefore, be seen that approximately 80.7 percent of the chromium and 92.7 percent of the iron were reduced.

*Example IV*

In this example, the same ore with the same particle sizes as shown in Examples II and III was mixed in the ratio of 100 parts of ore with 25 parts of fine metallurgical coke sized to pass a 200 mesh screen and 2 parts of fluorspar also sized to pass a 200 mesh screen. The mixture was pelletized as in Example II with an aqueous solution containing 5 percent sodium silicate. When the pellets reached diameters between 0.5 and 0.75 inch, a mixture of 45 parts of ore as used above; 45 parts of metallurgical coke, sized to pass a 25 mesh screen and remain on a 48 mesh screen; 6½ parts silica sized to pass a 200 mesh screen; 2.2 parts of limestone sized to pass a 200 mesh screen; and 1.3 parts of fine soda ash was agglomerated over said pellets with a 20 percent sodium silicate binder in which 2 weight percent bentonite was suspended. This coating layer was applied until the weight of the pellets increased by 30 percent. Subsequently a secondary layer was produced from a mixture of 50 parts of metallurgical coke sized to pass a 25 mesh screen and remain on a 48 mesh screen; 33.6 parts of silica sized to pass a 200 mesh screen; 11.1 parts of limestone sized to pass a 200 mesh screen; and 6½ parts of fine soda ash. This mixture was agglomerated over the first layer with the help of a 20 percent sodium silicate solution until the pellet weight increased approximately 20 percent.

The coated pellets were dried and 7500 parts of the dried pellets were heated together with 600 parts of metallurgical coke sized to pass a 14 mesh screen and remain on a 25 mesh screen, and with 3000 parts of petroleum coke of the same sizing. This mixture was then added to a rotary kiln with the same flame characteristics as used in Example III. The heating rate was such that the charge remained for 107 minutes in the temperature from 1050 to 1300° C., whereupon the charge was quenched under a carbon dioxide atmosphere. The interior of the pellets was composed of the following weight percents; 31.13 percent total chromium, 28.28 percent reduced chromium, 20.24 percent total iron, 19.57 percent reduced iron and 6.12 percent carbon. It may therefore be seen that about 91 percent of the chromium and approximately 96.6 percent of the iron were reduced although associated with a relatively low carbon content.

*Example V*

Chromite ore containing 30 weight percent chromium, 15 weight percent iron as oxides and about 15 weight percent $Al_2O_3$, 10 weight percent MgO, and 3 weight percent $SiO_2$ as gangue constituents was ground until 96 weight percent passed a standard 325 mesh screen. One hundred parts of this ground ore was mixed with 30 parts coal char 325 mesh by down, 4 parts of calcium carbonate 200 mesh by down, and 2 parts of calcium fluoride 200 mesh by down. The mixed powder was agglomerated on an inclined rotary pan-pelletizer with the aid of an 8 percent sodium silicate binder until the nodules measured about 0.25 inches by 4 mesh. The nodules were oven dried.

Three thousand four hundred grams of the dried, uncoated nodules were charged to a rotary kiln with 3,300 grams of coal char containing 6 weight percent iron-bearing ash. The kiln temperature was increased to 1400° C. and maintained at that temperature for a period of ten minutes. The total firing time was 81 minutes.

The reacted nodules were discharged under non-oxidizing conditions and cooled. The residual char weighed 1,854 grams, therefore, 1,446 or 43.7 weight percent of the charged char was combusted by the oxidizing flame gases during the firing operation. Free ash was not apparent in the residual char upon visual inspection. The treated nodules contained a vitreous slag coating formed from the agglomeration of ash resulting from the combustion of the char during firing. The treated nodules had the following analysis: 27.74 weight percent total chromium, 16.13 weight percent acid soluble chromium, 21.0 weight percent total iron and 2.65 weight percent carbon. Fifty-eight weight percent of the contained chromium was reduced.

We claim:

1. A method of producing coated compacts for use in reduction processes comprising preparing an intimate admixture of at least one metallic oxide, the metal of said metallic oxide being selected from the group consisting of iron, titanium, and chromium and a carbonaceous reducing agent, said carbonaceous reducing agent being in excess of that amount required to react stoichiometrically with the oxygen of said selected metal oxide to form carbon monoxide, said excess being sufficient to convert at least a substantial portion of said selected metals to a carbide of said selected metal; compacting said admixture to form a core; and providing said core with a coating of at least one acid slag-forming constituent and at least one basic slag-forming constituent to form a coated compact, said slag forming constituents being capable of at least partial fusion before the core reaction is completed and being sufficiently viscous to preclude substantial impregnation of said core at the fusion temperature of said slag-forming constituents and at the temperature of said core reaction.

2. A method of producing coated compacts for use in reduction processes comprising preparing intimate admixture of at least one metallic oxide, the metal of said metallic oxide being selected from the group consisting of iron, titanium, and chromium, a binder and a carbonaceous reducing agent, said carbonaceous reducing agent being in excess of that amount required to react stoichiometrically with the oxygen of said selected metal oxide to form carbon monoxide, said excess being sufficient to convert at least a substantial portion of said selected metals to a carbide of said selected metal; compacting said admixture to form a core; providing said core with a coating of at least one acid slag-forming constituent, at least one basic slag-forming constituent and a binder to form a coated compact, said slag forming constituents being capable of at least partial fusion before the core reaction is completed and being sufficiently viscous to preclude substantial impregnation of said core at the fusion temperature of said slag-forming constituents and at the temperature of said core reaction; and superficially studding said coated core with carbonaceous particles to form a final compact.

3. A method of producing coated compacts for use in reduction process comprising preparing an intimate admixture of at least one metallic oxide, the metal of said metallic oxide being selected from the group consisting of iron, titanium, and chromium, a binder and a carbonaceous reducing agent, said carbonaceous reducing agent being in excess of that amount required to react stoichiometrically with the oxygen of said metal oxide to form carbon monoxide, said excess being sufficient to convert at least a substantial portion of said selected metals to a carbide of said selected metal; agglomerating said admixture to form a core; providing said core with a coating of at least one acid slag-forming constituent, a small amount of carbon and a metal capable of forming a basic slag-forming constituent upon oxidation, said slag forming constituents being capable of at least partial fusion before the core reaction is completed and being sufficiently viscous to preclude substantial impregnation of said core at the fusion temperature of said slag-forming constituents and at the temperatures of said core reaction; and superficially studding said coated core with carbonaceous reducing particles to form a final compact.

4. A method of producing coated compacts for use in reduction processes comprising preparing an intimate admixture of chromite ore, sodium silicate, burned lime, fluorspar and carbonaceous reducing agent, said carbonaceous reducing agent being in excess of that amount required to react stoichiometrically with the oxygen of the iron oxide and the chromium oxide of said chromite ore to form carbon monoxide, said excess being sufficient to convert at least a substantial portion of the iron and chromium of said chromite ore to the carbides of iron and chromium; agglomerating said admixture to form a core; providing said core with a coating of at least one acid slag-forming constituent, a small amount of carbon and a metal capable of forming a basic slag-forming constituent upon oxidation, said slag forming constituents being capable of at least partial fusion before the core reaction is completed and being sufficiently viscous to preclude substantial impregnation of said core at the fusion temperature of said slag-forming constituents and at the temperature of said core reaction; and superficially studding said coated core with carbonaceous reducing particles to form a final compact.

5. A method of producing coated compacts and a method of reducing the same comprising preparing an intimate admixture of chromite ore and a carbonaceous reducing agent, said carbonaceous reducing agent being in excess of that amount required to react stoichiometrically with the oxygen of the chromium oxide and iron oxide components of said chromite ore to form carbon monoxide, said excess being sufficient to convert at least a substantial portion of the iron and chromium of said chromite ore to the carbides or iron and chromium; agglomerating said admixture to form a core-compact; charging said core-compacts into a rotary kiln containing carbonaceous material having a high ash-content; rotating said kiln and firing said kiln with an oxidizing atmosphere at a temperature sufficient to cause combustion of a substantial amount of said carbonaceous reducing agent having said high ash-content and at a temperature sufficient to cause reaction between said iron oxide and said chromium oxide of said core-compact, said high ash-content of said carbonaceous reducing material containing said high ash-content coating said core-compact to form a slag-coating on said core-compact prior to the completion of the reaction in said core-compact; and removing the reacted agglomerates from said oxidizing atmosphere under non-oxidizing conditions.

6. A method of producing coated compacts and a method of reducing the same comprising preparing an intimate admixture of chromite ore and a carbonaceous reducing agent, said carbonaceous reducing agent being in excess of that amount required to react stoichiometrically with the oxygen of the chromium oxide and iron oxide components of said chromite ore to form carbon monoxide, said excess being sufficient to convert at least a substantial portion of the iron and chromium of said chromite ore to the carbides of iron and chromium; agglomerating said admixture to form a core-compact; charging said core-compacts to a rotary kiln containing fine fly ash and fine silidica; rotating said kiln and firing said kiln with an oxidizing atmosphere at a temperature sufficient to cause partial fusion of said fly ash and said silica and at a temperature sufficient to cause reaction between said iron oxide and said chromium oxide of said core-compact, whereby said partially fused fine fly ash and fine silica provide a protective slag coating on said core-compact prior to the completion of the reaction in said core-compact; and removing the reacted agglomerates from said oxidizing atmosphere under non-oxidizing conditions.

7. A method of producing coated compacts for use in reduction processes comprising preparing an intimate admixture of chromite ore, coke, fluorspar and a sodium-silicate binder, said chromite ore and said coke being about 95 weight percent below 325 Standard Tyler size and said coke being in excess of that amount required to react stoichiometrically with the oxygen of the iron oxide and the chromium oxide of said chromite ore to form carbon monoxide, said excess being sufficient to convert at least a substantial portion of the iron and chromium of said chromite ore to the carbides of iron and chromium; agglomerating said admixture by rolling to form a core; rolling said core in hematite, silica, calcium carbonate, sodium carbonate and a binder of an aqueous bentonite-water glass slurry to provide a slag-forming coating on said core, said slag-forming coating being capable of at least partial fusion at a temperature of about 600° C. and being sufficiently viscous to precluded substantial impregnation of said core at the fusion temperature of said slag-forming constituent and at the temperature of said core reaction; superifically studding said coated core with coal to form a final agglomeration.

8. A method of producing coated compacts for use in reducing processes comprising preparing a first intimate admixture of chromite ore, coal char and water glass, said chromite being about 95 weight percent below 325 Standard Tyler mesh and said coke being about 95 weight percent below 200 Standard Tyler mesh and said carbonaceous reducing agent being present in that amount required to react stoichiometrically with the oxygen of the chromium oxide and iron oxide of said chromite ore to form carbon monoxide; agglomerating said admixture by rolling to form a core ranging from 0.5 to 0.75 inch in diameter; preparing a second intimate admixture of chromite ore, coal char, fluorspar and water glass, said chromite being about 95 weight percent below 325 Standard Tyler mesh and said coke being about 95 weight percent below 200 Standard Tyler mesh and said carbonaceous reducing agent being present in excess of the amount required to react stoichiometrically with the oxygen of said chromium oxide to form carbon monoxide, said excess being sufficient to convert at least a substantial portion of said iron and chromium of said chromite ore to the carbides of iron and chromium; rolling said core prepared from said first admixture in said second admixture until approximately 20 weight percent of said second admixture has been coated on said first mixture to form a non-homogeneous core; rolling said non- homogeneous core in coal char, limestone, silica and a sodium silicate to form a slag-forming coating, said slag-forming coating being capable of at least partial fusion at a temperature of about 600° C. and being sufficiently viscous to preclude substantial impregnation of said core at the fusion temperature of said slag-forming constituents and at the temperature of said core reaction; and superficially studding said coated core with particles of coke to form a final agglomeration.

9. A method for producing coated compacts for use in reduction processes and heat treatment of the same comprising preparing an intimate admixture of at least one metallic oxide the metal of said oxide being selected from the group consisting of iron, titanium, and chromium, and a carbonaceous reducing agent, said carbonaceous reducing agent being in excess of that amount required to react stoichiometrically with the oxygen of said metal oxide to form carbon monoxide, said excess being sufficient to convert at least a substantial portion of the selected metal to carbides of said selected metal; agglomerating said admixture to form a core; providing said core with a coating of at least one acid slag-forming constituent and at least one basic slag-forming constituent to form a coated compact, said slag forming constituents being capable of at least partial fusion before the core reaction is completed and being sufficiently viscous to preclude substantial impregnation of said core at the fusion temperature of said slag-forming constituents and at the temperature of said core reaction; heating said agglomeration until said agglomeration has attained a sufficiently high temperature to cause at least partial fusion of said slag coating before said core reaction is completed and to cause reaction in said intimate admixture of said core; and removing the reacted agglomerates from said heating atmosphere under conditions substantially not conducive to oxidation.

10. A method of producing coated compacts for use in reduction processes and heat treatment of the same comprising preparing an intimate admixture of chromite ore, sodium silicate, burned lime, fluorspar and carbonaceous reducing agent, said carbonaceous reducing agent being in excess of that amount required to react stoichiometrically with the oxygen of said metal oxide to form carbon monoxide, said excess being sufficient to convert at least a substantial portion of said iron and chromium of said chromite ore to the carbide of iron and chromium; agglomerating said admixture to form a core; providing said core with a coating of at least one acid slag-forming constituent, and a metal capable of forming a basic acid slag-forming constituent upon oxidation, said slag forming constituents being capable of at least partial fusion and being sufficiently viscous to preclude susbtantial impregnation of said core at the fusion temperature of said slag-forming constituents and at the temperature of said core reaction; superficially studding said coated core with carbonaceous reducing particles to form a final agglomeration; heating said agglomeration with an oxidizing heating atmosphere for a sufficient time and until the agglomeration has attained a sufficiently high temperature to cause at least partial fusion of said slag coating and to cause reaction in said core; and removing the reacted agglomerates from said heating atmosphere under conditions substantially not conducive to oxidation.

11. A method of producing and reducing slag coated chromite ore agglomerations comprising preparing a first intimate admixture of chromite ore, coal char and water glass, said chromite being about 95 weight percent below 325 Standard Tylor mesh and said coke being about 95 weight percent below 200 Standard Tyler mesh and said carbonaceous reducing agent being present in that amount required to react stoichiometrically with the oxygen of the chromium and iron of said chromite ore to form carbon monoxide, agglomerating said admixture by rolling to form a core ranging from 0.5 to 0.75 inch in diameter; preparing a second intimate admixture of chromite ore, coal char, fluorspar and water glass, said chromite being about 95 weight percent below 325 Standard Tyler mesh and said coke being about 95 weight percent below 200 Standard Tyler mesh and said carbonaceous reducing agent being present in excess of that amount required to react stoichiometricaly with the oxygen of said chromite ore to form carbon monoxide, said excess being sufficient to convert at least a substantial portion of the iron and chromium of said chromite ore to the carbides of iron and chromium; rolling said core prepared from said first admixture in said second admixture to form a duplex core until approximately 20 weight percent of said second admixture has been coated on said first admixture; rolling said duplex core in coal char, limestone, silica and a sodium silicate to form a slag-forming coating on said duplex core, said slag-forming coating being capable of at least partial fusion and being sufficiently viscous to preclude substantial impregnation of said core at the fusion temperature of said slag forming constituents and at the temperature of said core reaction; superficially studding said coated core with coke to form a final agglomeration; contacting said agglomerate with an oxidizing heating atmosphere at a temperature of 1050 to 1400° C. for a period of time sufficient to cause substantial reaction in said duplex core; and removing the reacted agglomerates from the said oxidizing heating atmosphere to a reducing atmosphere for cooling.

12. A product of manufacture comprising a core containing at least one metallic oxide, said metal of said oxide being selected from the group consisting of iron, titanium, and chromium and carbonaceous reducing material said carbonaceous reducing material being in excess of that amount required to react stoichiometrically with the oxygen of the said selected metals to form carbon monoxide and said excess being sufficient to convert a substantial portion of said selected metals to the carbides of said selected metals; and a slag-forming coating surrounding said core said coating containing at least one acid slag forming constituent and at least one basic slag-forming constituent, said slag forming constituents being present in such a ratio as to cause at least partial fusion of the coating at the reaction temperature of said core, said slag-forming coating being sufficiently viscous at the fusion temperature of said slag-forming constituents and at the reaction temperatures of said core to preclude substantial impregnation of said core.

13. A product of manufacture comprising a non-homogeneous compact containing chromite ore, a carbonaceous reducing material, limestone and fluorspar said non-homogeneous core containing an inner zone and an outer zone, said inner zone being characterized by at least that amount of carbonaceous reducing material required to react stoichiometrically with the oxygen of said metallic oxide to form carbon monoxide and said outer zone being characterized by carbonaceous reducing material in excess of that amount required to react stoichiometrically with the oxygen of said chromite ore, said excess being sufficient to convert at least a substantial portion of the iron and chromium of said chromite ore to the carbides of iron and chromium; and a slag-forming coating surrounding said outer zone of said non-homogeneous core, said slag-forming coating containing, at least one acid slag-forming constituent, at least one basic slag-forming constituent and a binder, said slag-forming constituents being present in such a ratio as to cause at least partial fusion of said coating at the reaction temperature of said core, and said slag-forming coating being sufficiently viscous at the fusion temperature of said slag forming constituents and at the reaction temperature of said core to preclude substantial impregnation of said core.

14. A product of manufacture comprising a core containing at least one metallic oxide, said metal of said oxide being selected from the group consisting of iron, titanium and chromium and carbonaceous reducing material said carbonaceous reducing material being in excess of that amount required to react stoichiometrically with the oxygen of the said selected metals to form carbon monoxide and said excess being sufficient to convert a substantial portion of said selected metals to the carbides of said selected metals; and a slag-forming coating surrounding said core said coating containing at least one acid slag-forming constituent and at least one metal capable of forming a basic slag-forming constituent upon oxidation, said slag-forming constituents being present in such a ratio as to cause at least partial fusion of the coating at the reaction temperature of said core, said slag-forming coating being sufficiently viscous at the fusion temperature of said slag-forming constituents and at the reaction temperatures of said core to preclude substantial impregnation of said core.

References Cited in the file of this patent

UNITED STATES PATENTS

| 2,806,776 | Veale et al. | Sept. 17, 1957 |
| 2,869,850 | Wienert | Jan. 20, 1959 |
| 2,990,268 | DeVaney | June 27, 1961 |

FOREIGN PATENTS

| 17,270 | Great Britain | of 1888 |

OTHER REFERENCES

Klinefelter: Bureau of Mines, Report of Investigations 3846, January 1946, 14 pages, pages 7 and 10 pertinent. (Copy in Scientific Library)